Nov. 28, 1933.  N. ARESON  1,936,745
PNEUMATIC TIRE RIM
Filed Dec. 24, 1931  3 Sheets-Sheet 1
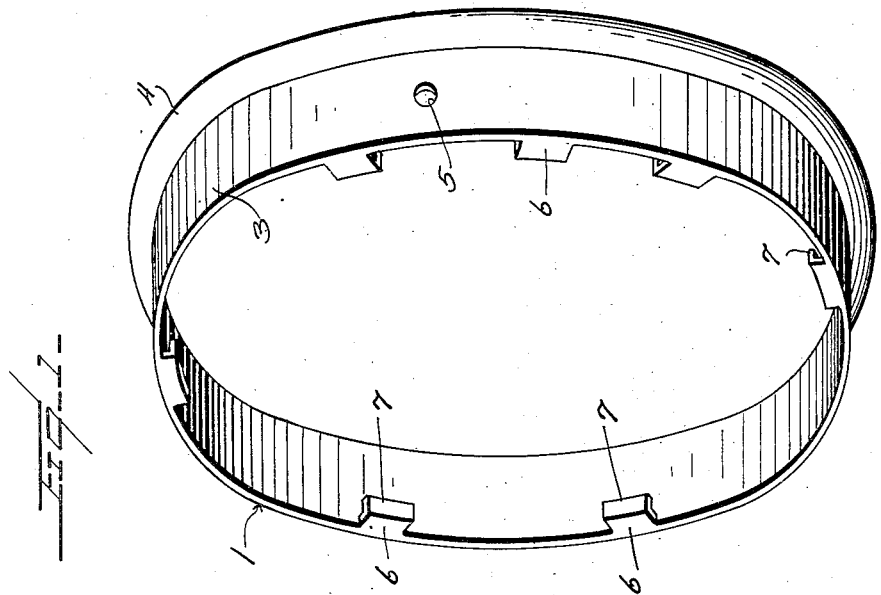
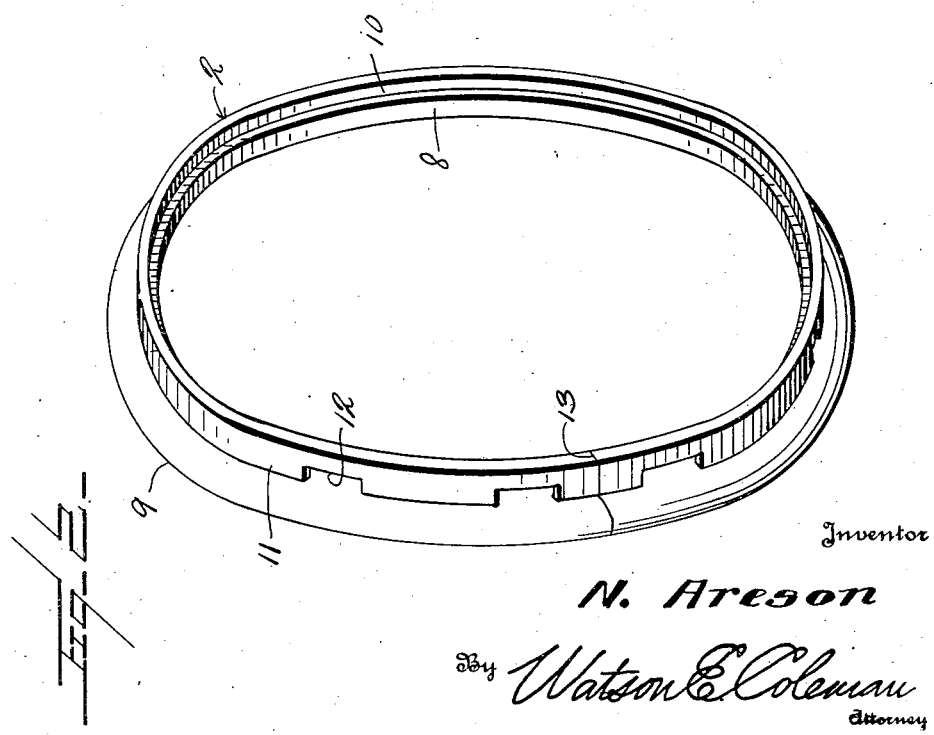
Inventor
N. Areson
By Watson E. Coleman
Attorney Nov. 28, 1933.      N. ARESON      1,936,745
PNEUMATIC TIRE RIM
Filed Dec. 24, 1931      3 Sheets-Sheet 2
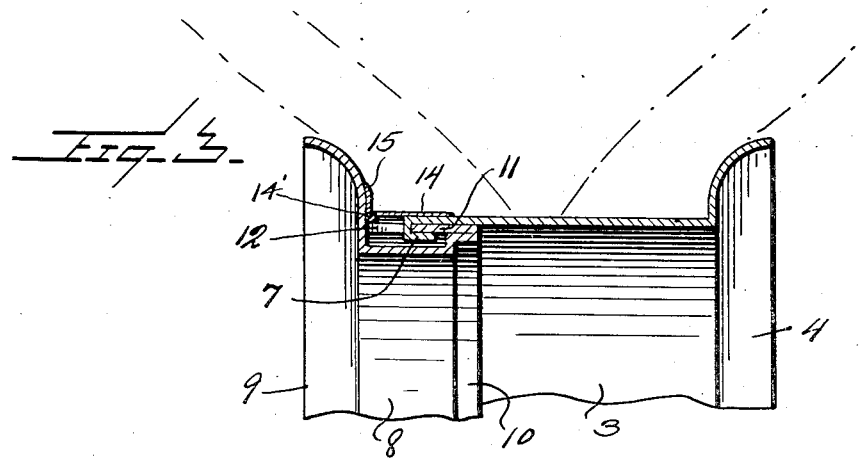
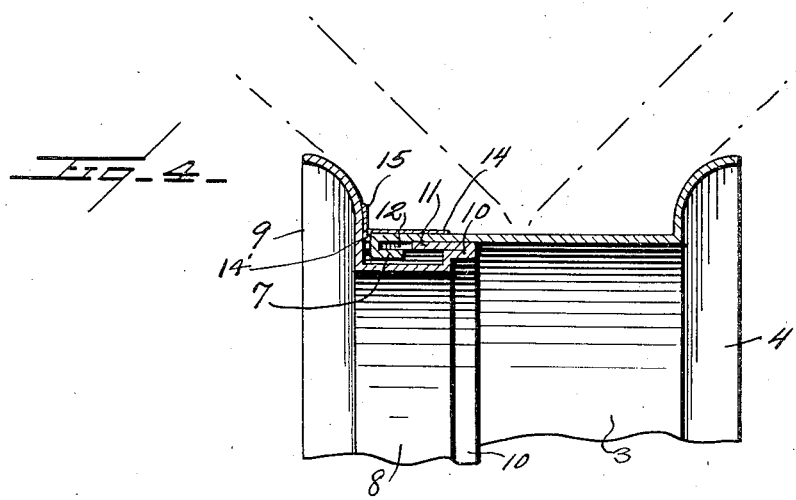
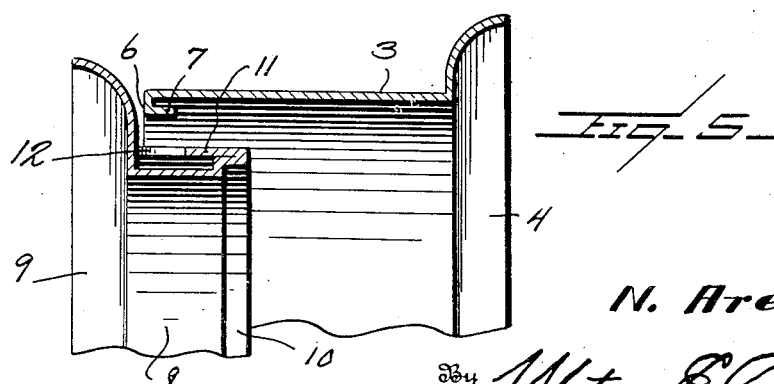
Inventor
N. Areson
By Watson E. Coleman
Attorney Nov. 28, 1933.    N. ARESON    1,936,745
PNEUMATIC TIRE RIM
Filed Dec. 24, 1931    3 Sheets-Sheet 3
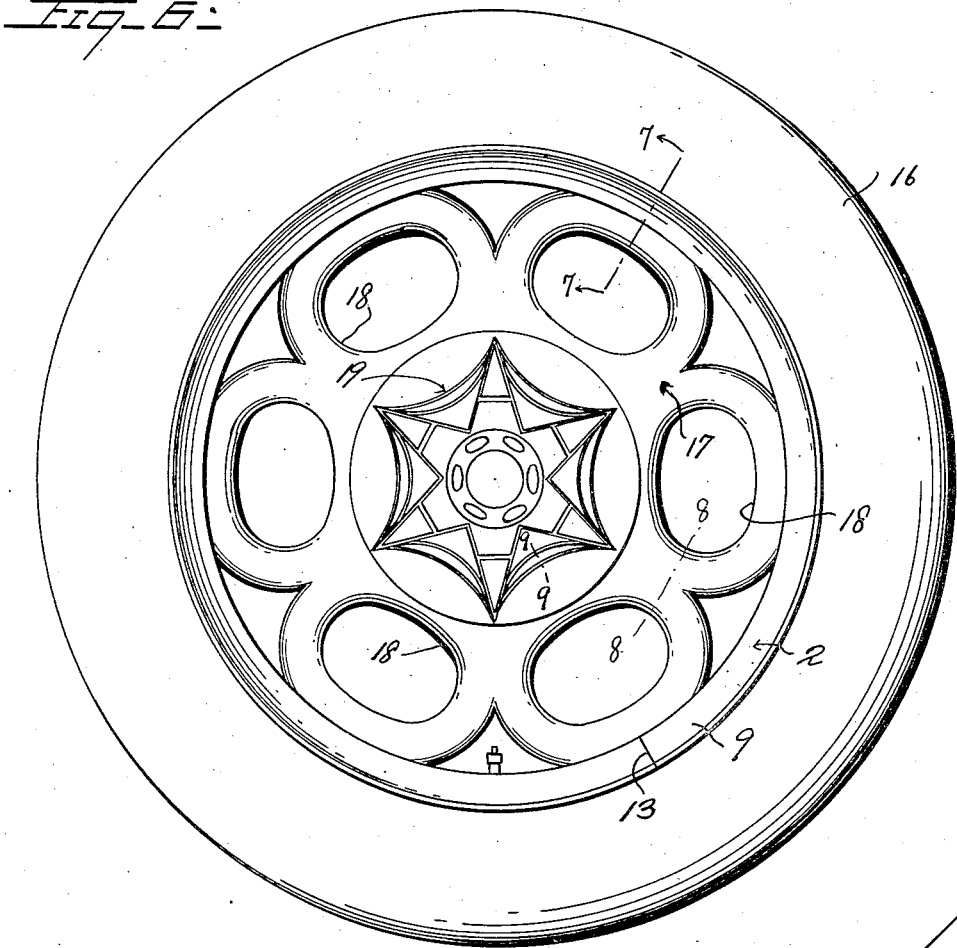
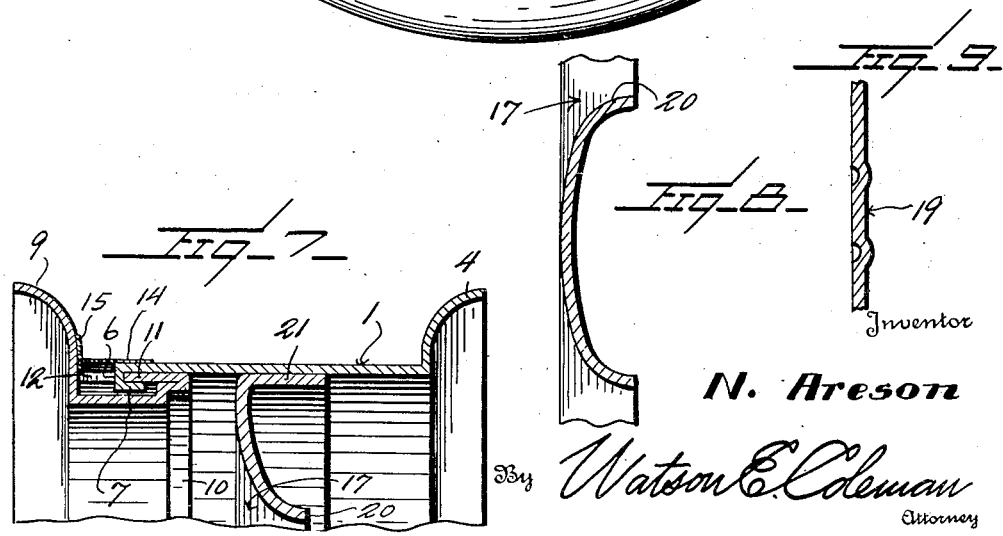
Inventor
N. Areson
By Watson E. Coleman
Attorney Patented Nov. 28, 1933

1,936,745

UNITED STATES PATENT OFFICE 1,936,745

PNEUMATIC TIRE RIM

Nels Areson, Pittsburgh, Pa.

Application December 24, 1931
Serial No. 583,123

4 Claims. (Cl. 152—21)

This invention relates to the class of vehicle wheels and pertains particularly to improvements in pneumatic tire rims and wheel structures.

The primary object of the present invention is to provide a pneumatic tire rim which is separable into two parts for applying or removing a tire and which parts are so connected as to be normally retained in locked relation by the tire thereon.

Another object of the invention is to provide a pneumatic tire rim formed in two units which are so designed that they may be easily and economically constructed.

Another object of the invention is to provide a pneumatic tire rim in which a pressed steel disk may be readily fitted, which disk may be of solid or open character.

Still another object of the invention is to provide a novel pneumatic tire carrying wheel having a rim portion in two parts and having an open disk center designed to provide an artistic hub cap portion.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 illustrates in perspective the major one of the two units forming the improved rim;

Figure 2 is a view in perspective of the minor one of the two rim units;

Figure 3 is a transverse sectional view of the assembled rim showing the position in which the two parts thereof are held by a tire thereon;

Figure 4 is a view similar to Figure 3 but showing the two portions or units of the rim moved together preparatory to separating the same;

Figure 5 is a view illustrating the relative positions of the two units of the rim when the minor unit has been contracted.

Figure 6 is a view in side elevation of the rim showing a tire thereon and showing an apertured disk secured therein;

Figure 7 is a sectional view taken on the line 7—7 of Figure 6;

Figure 8 is a sectional view taken on the line 8—8 of Figure 6;

Figure 9 is a sectional view taken upon the line 9—9 of Figure 6.

Referring now more particularly to the drawings wherein like numerals of reference indicate corresponding parts throughout the several views, it will be seen upon reference to Figures 1 and 2 that the rim structure embodying the present invention is comprised of two units which are indicated by the numerals 1 and 2, the numeral 1 indicating what will be referred to as the major unit or portion and the numeral 2 indicating what will be referred to as the minor unit or portion.

As shown, the major unit of the rim comprises a relatively broad annular body 3 about one edge of which is formed the integral flange 4 which bears against one side of the tire which may be mounted thereon. An aperture 5 is formed through the major unit at the proper point, to receive the pneumatic tire valve stem.

Disposed about the other or inner edge of the unit 3 are a number of hook members each of which constitutes a radially extending portion 6 which has its outer face or surface flush with the edge of the annulus and an inwardly turned terminal or bell portion 7 which is directed axially of the unit.

The minor unit 2 is also in the form of a relatively broad annulus 8 but is not nearly so broad as the unit 3 as will be seen upon reference to Figures 3 to 5 inclusive. This annulus 8 has a flange 9 formed integral with one edge thereof which corresponds with the flange 4 of the unit 3 and which bears against the other side of a tire mounted on the rim. The other or inner edge of the annulus 8 of the unit 2 has an outwardly projecting surrounding shoulder 10 which as shown forms an integral continuation of the said inner edge and this shoulder merges into the inner edge of an outer annulus 11 which extends inwardly therefrom and abuts the inner side of the flange 9, the major portion of this outer annulus being spaced by the shoulder 10 from the inner annulus 8. The outer edge portion of the outer annulus 11 is provided with a plurality of notches 12 corresponding in number with the hooks on the major unit 3. This minor unit 2 is split transversely at one point as indicated at 13 so that its diameter may be reduced slightly by offsetting the adjacent edges at this split and overlapping the ends.

In assembling the rim embodying the present invention, as when mounting a tire thereon, the tire is first slipped over the broader major unit 1 until one side abuts the flange 4. The minor unit 2 is then contracted by shifting the end portions thereof formed by the split 13 until they come into overlapping relation, whereupon the inner edge thereof is slipped into the unit 1 and rotated until the notches 12 are in the proper position to receive the hooks 7. By then opening the minor unit to bring the ends thereof into alignment again it will be seen that the hooks 7 will be extended into the notches 12, as illustrated in Figure 2. By then pulling the minor unit as if to remove it from the major unit the hooks 7 will be caused to slide under the outer annulus 11 so that the two units will then assume the positions shown in Figure 3.

After placing the tire on the major unit 1 and before attaching the minor unit thereto, there is slipped into position between the tire and the major unit adjacent the hook carrying edge thereof, the relatively thin band 14 which at its outer edge is bent inwardly and then back upon itself or outwardly to form the inwardly projecting double thickness flange 14'. The metal of the band is then continued from this flange outwardly to form the outer surrounding flange 15 which bears upon its inner face against the outer adjacent side of the tire. As shown, the inwardly projecting flange 14' extends inwardly with respect to the rim, between the free edge of the major portion 1 and the flange 9 of the minor portion. While this band 14 is preferably formed as an unbroken annulus, it is, of course, obvious that it may be transversely split if such construction is found necessary to facilitate its application to the rim.

This flange 15 is secured firmly in position between the tire and the flange 9 of the minor unit when the rim is assembled, and serves to prevent portions of the tire being forced down by pressure into the notches 12.

Figure 6 illustrates a rim constructed in accordance with the present invention, having a tire 16 thereon and having mounted within the major portion 1 thereof the disk-like center which is indicated as a whole by the numeral 17 and which, as shown, is cut out at spaced intervals to form the opening 18. The central portion of this disk center 17 is formed to provide a hub cap 19, the disk portion beneath the hub cap being formed in the usual manner (not shown) to facilitate the attachment of the wheel to a motor vehicle axle.

The parts surrounding the cut-out areas 18 of the disk are preferably rounded as indicated at 20 so as to give rigidity to the center structure as well as giving to it an artistic appearance.

The peripheral portion of the wheel center structure 17 is formed to provide the relatively broad flange 21 which positions against the inner face of the portion 3 of the major unit to which it may be welded or otherwise suitably secured.

From the foregoing description it will be readily apparent that a pneumatic tire may be mounted upon or removed from a rim constructed in accordance with the present invention with more facility and ease than is possible with rims of other types where either the entire rim body is in a single piece and is split transversely and must be sprung to a smaller diameter or else is unbroken throughout so that the tire must be stretched over the flanges by means of tools.

Having thus described the invention, what is claimed is:—

1. A tire rim comprising a pair of annular units, one thereof being of substantial width, a tire engaging flange formed about one edge of the last mentioned unit, inwardly turned hook members formed about the other edge of the last mentioned unit, the other of said units comprising an inner annular band having a tire engaging flange formed about one edge and having an integral outwardly projecting shoulder formed about the other edge and an outer band forming a turned back continuation of said shoulder and maintained in spaced relation by the shoulder with the inner band and further having its free edge engaging the flange of the inner band, said outer band having a plurality of recesses formed about its free edge for the reception of the hooks of the first mentioned unit when the latter is in encircling relation with the second unit, said second unit being transversely split to facilitate its contraction.

2. A tire rim, comprising a pair of annular units one of which is of materially greater width and internal diameter than the other, a tire engaging flange formed about one edge of each of said units, the unit of smaller diameter having a radially directed surrounding integral flange at the edge opposite the first mentioned flange thereof and further having a co-axial extension formed integral with the free edge of the radial flange and directed away from the tire engaging flange, a flat annular member surrounding said last mentioned unit and forming an integral continuation of the said co-axial extension and directed inwardly therefrom toward and engaging the adjacent tire engaging flange, the said radial flange operating to maintain said annular member in spaced relation to the adjacent annular unit and said annular member having a plurality of apertures therein adjacent the edge which abuts the tire engaging flange, and a plurality of inturned hook members formed integral with the free edge of the unit of greater diameter and adapted to enter the apertures of the other unit in the assembled rim, the said unit of smaller diameter being split to facilitate the coupling of the units together.

3. A tire rim, comprising a pair of annular units one of which is of materially greater width and internal diameter than the other, a tire engaging flange formed about one edge of each of said units, the unit of smaller diameter having a radially directed surrounding integral flange at the edge opposite the first mentioned flange thereof and further having a coaxial extension formed integral with the free edge of the radial flange and directed away from the tire engaging flange a flat annular member surrounding said last mentioned unit and forming an integral continuation of the said co-axial extension and directed inwardly therefrom toward and engaging the adjacent tire engaging flange, the said radial flange operating to maintain said annular member in spaced relation to the adjacent annular unit and said annular member having a plurality of apertures therein adjacent the edge which abuts the tire engaging flange, a plurality of inturned hook members formed integral with the free edge of the unit of greater diameter and adapted to enter the apertures of the other unit in the assembled rim, the said unit of smaller diameter being split to facilitate the coupling of the units together, and a relatively thin annular band surrounding the unit of greater diameter adjacent the edge from which said hooks extend and overlying the apertures of the annular member of the other unit and abutting the tire engaging flange of the said other unit.

4. A tire rim, comprising a pair of annular units one of which is of greater width and internal diameter than the other, a tire engaging flange formed about one edge of each of said units, the unit of smaller diameter having a radially directed surrounding flange at the other edge thereof and further having a coaxial extension connected with the free edge of the radial flange and directed away from the tire engaging flange, a flat annular member surrounding said last mentioned unit and forming an inward extension from said coaxial extension toward the tire engaging flange, the said radial flange maintaining the annular member in spaced relation with the adjacent annular unit, the said annular member having a portion of its edge terminating short of the tire engaging flange, and an inturned hook member at the free edge of the unit of greater diameter and adapted to receive the said edge of the annular member, the unit of smaller diameter being split to facilitate coupling the units together.

NELS ARESON.